(12) United States Patent
Sheedy et al.

(10) Patent No.: US 8,824,855 B2
(45) Date of Patent: Sep. 2, 2014

(54) DIGITAL PROGRAM SPLICE VISUAL QUALITY

(75) Inventors: Sean M. Sheedy, Lake Oswego, OR (US); Guy Cherry, Beaverton, OR (US)

(73) Assignee: ARRIS Solutions, Inc., Suwanee, GA (US)

( * ) Notice: Subject to any disclaimer, the term of this patent is extended or adjusted under 35 U.S.C. 154(b) by 696 days.

(21) Appl. No.: 12/335,446

(22) Filed: Dec. 15, 2008

(65) Prior Publication Data

US 2009/0180750 A1 Jul. 16, 2009

Related U.S. Application Data

(60) Provisional application No. 61/007,704, filed on Dec. 13, 2007.

(51) Int. Cl.
*H04N 5/935* (2006.01)

(52) U.S. Cl.
USPC .......................................................... 386/211

(58) Field of Classification Search
USPC .......................................................... 386/211
See application file for complete search history.

(56) References Cited

U.S. PATENT DOCUMENTS

| | | | | |
|---|---|---|---|---|
| 6,188,703 | B1* | 2/2001 | Dobson et al. | 370/537 |
| 7,096,481 | B1* | 8/2006 | Forecast et al. | 725/32 |
| 2002/0150392 | A1* | 10/2002 | Yoo et al. | 386/111 |
| 2006/0093315 | A1* | 5/2006 | Kelly et al. | 386/52 |
| 2006/0153538 | A1* | 7/2006 | Himeno et al. | 386/111 |

* cited by examiner

*Primary Examiner* — Thai Tran
*Assistant Examiner* — Jose Mesa
(74) *Attorney, Agent, or Firm* — Troy A. Van Aacken (57) ABSTRACT

A digital splicing process includes calculating the length of data to be inserted into a transport stream between first and second video clips; and removing B-frames in the second clip that reference non-existent I-frames without replacing the removed B-frames with new B-frames.

20 Claims, 5 Drawing Sheets

DIGITAL PROGRAM SPLICE VISUAL QUALITY

PRIORITY CLAIM

This application claims priority under 35 USC 119 to USA application No. 61/007,704 filed on Thursday, Dec. 13, 2007, which is presently pending.

TECHNICAL FIELD

The present disclosure relates to digital program splicing.

BACKGROUND

Low-end cable set-top boxes (such as the Motorola DCT 2000 or Scientific Atlanta Explorer 2000) often display splices between two video clips poorly. Visual artifacts such as MPEG macroblocking, stuttering, and green flashes on the screen are common. The visual quality of splices on these low-end set-top boxes is generally poor because:

After the splice point, the presentation time of the first decoded frame (in the second video clip) does not match the expected frame presentation time, which is derived from the time base of the first video clip. This can cause the frame to be delivered to the analog video display circuitry part way through a frame refresh, producing analog video artifacts (such as the aforementioned green flash).

The MPEG decoder ignores both the transport layer discontinuity indicators and the Broken Link flag in the Group of Pictures header which immediately follows the splice, and decodes the first two B-frames in the second video clip. Decoding the B-frames at this point uses an incorrect reference frame (from the first video clip), resulting in digital video artifacts (such as the aforementioned macroblocking).

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

GLOSSARY

PTS—Presentation Time Stamp, indicates to the rendering logic when to present the associated content PCR—Program Clock Reference, information that enables the decoder to reconstruct the encoder's clock PAT—Program Association Table, maps PIDs of PMTs PMT—Program Map Table, associates PIDs with substreams PES—Packetized Elementary Stream DTS—Decoder Time Stamp, indicates when it's time to present a packet to the decoder Overview Described herein is a new, low-overhead method for improving splice visual quality on low-end cable set-top boxes. It comprises two parts:

Calculating at video delivery time the length of MPEG data to be inserted into the transport stream between the two clips.

Removing at video delivery time B-frames in the second clip that reference non-existent I-frames.

MPEG Data Insertion

Figure 1:
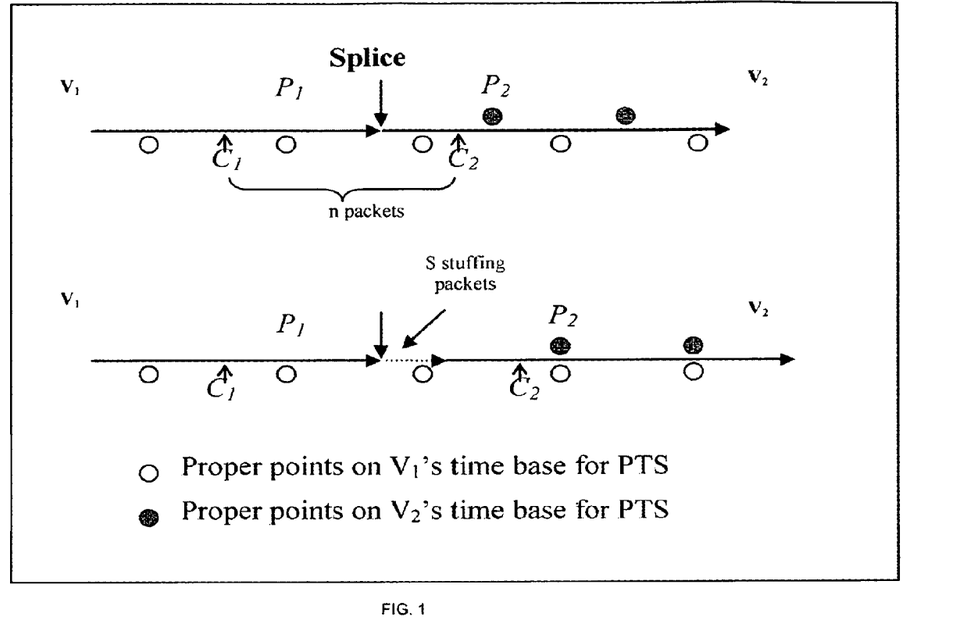
FIG. 1 shows an embodiment of a splice where video clip $V_1$ is followed by video clip $V_2$.

FIG. 1 shows a splice where video clip $V_1$ is followed by video clip $V_2$. The values $P_1$ and $C_1$ and are respectively the PTS of the last frame in $V_1$ and its PCR. The values $P_2$ and $C_2$ are the PTS of the first frame in $V_2$ and its PCR. ("First" and "last" are in transport stream order, not in presentation order.) Note that in general $V_1$ and $V_2$ have different time bases; i.e., there is no relation between the values of $C_1$ and $C_2$.

Extra stuffing packets (such as MPEG null packets) may be inserted into the transport stream at the splice point to shift $P_2$ so that it is an integer number of frame periods from $P_1$. In this way the established frame periodicity is not shifted during the transition into $V_2$.

For the purposes of illustrating this process, assume initially that the bit rate is identical in both video clips. Also assume that the current number of transport packets, n, between $C_1$ and $C_2$ is known and that the transport packet period, R, is known and constant across both clips. (Note that these assumptions do not hold true in general, real-world applications, and will be relaxed later.)

FIG. 1 shows the PTS points from $V_1$ (white circles) brought into alignment with the PTS points from $V_2$ (black points) by adding stuffing packets.

Figure 2:
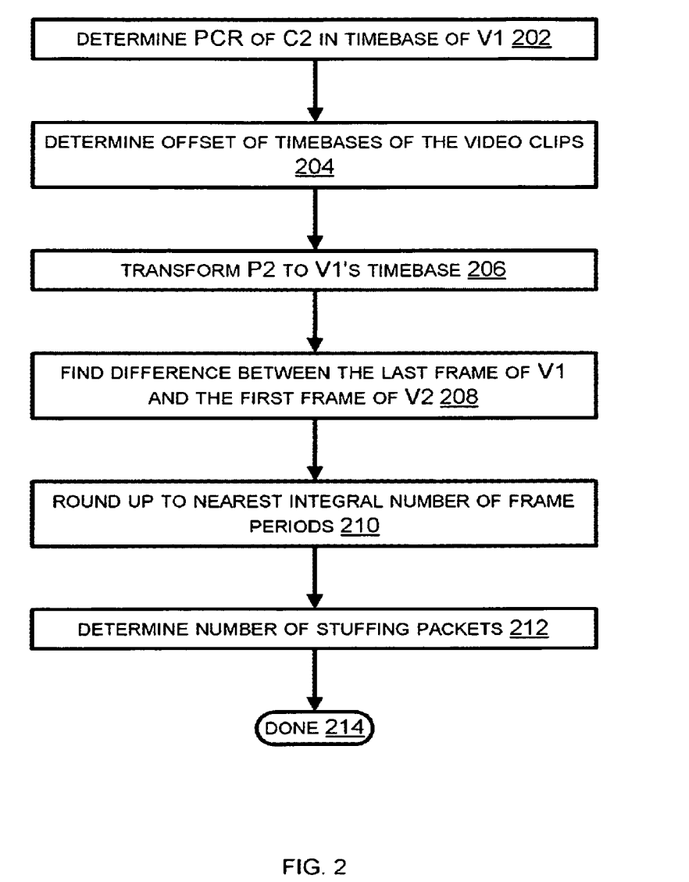
FIG. 2 is a flow chart of an embodiment of a process for determining the number of stuffing transport packets, S, between spliced video clips.

An embodiment of a process for determining the number of stuffing transport packets, S, follows. FIG. 2 is a flow chart of the described process embodiment.

In the illustrated embodiment, first calculate the extrapolated value in $V_1$'s time base for the transport packet containing $C_2$ (202). This may in some embodiments be a straight extrapolation of n packets from $C_1$ given the packet period, R:

$$C_{21} = C_1 + (n \times R)$$

This value may be applied to calculate the offset, $\Delta_C$, of the two time bases (204):

$$\Delta_C = C_{21} - C_2$$

$\Delta_C$ may be applied to transform from one timebase to another, e.g. to transform $P_2$ to $V_1$'s timebase (206). Note that $\Delta_C$ may be in 27 MHz PCR clock units and thus need to be converted to its 90 KHz PTS clock equivalent:

$$P_{21} = P_2 + (\Delta_C \div 300)$$

With $P_{21}$ and $P_2$ the difference between the last frame of $V_1$ and the first frame of $V_2$ may be determined (208):

$$\Delta_P = P_{21} - P_1$$

For a frame period, F, expressed in 90 KHz PTS clock units (3003 for NTSC video), round $\Delta_P$ up to an integral number of frame periods (210):

$$\Delta_F = ((int)((\Delta_P + F - 1) \operatorname{div} F)) \times F$$

The number of stuffing packets, S, to be inserted is then (212):

$$S = (int)((\Delta_F - \Delta_P) \div (R \div 300))$$

Note that R is in units of the 27 MHz PCR clock but the numerator is in units of the 90 KHz PTS clock, hence the division by 300. Also the calculation shows the conversion from floating point to integer as truncation; this is done solely to simplify the example. In reality, rounding to the nearest packet is better.

Figure 3:
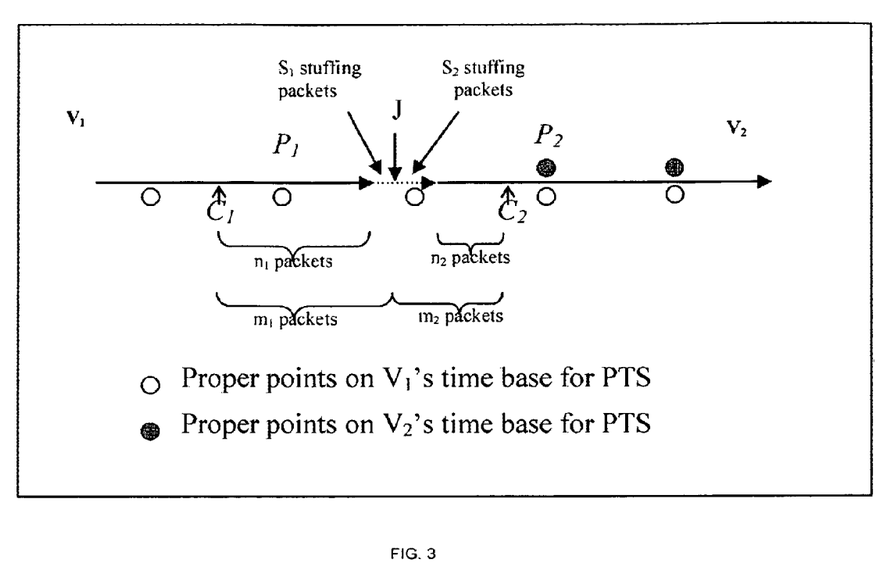
FIG. 3 is an illustration of this situation in which the bit rate differs between two spliced video clips.

Next, one of the initial assumptions may be relaxed, so that the bit rate changes between the two video clips. FIG. 3 is an illustration of this situation. In FIG. 3, J represents the point at which the bit rate changes between the video clips. The previous number of stuffing transport packets, S, has been decomposed into the number of stuffing transport packets, $S_1$ and $S_2$, on either side of the bit rate change. The number of transport packets, n, is decomposed into $n_1$ and $n_2$. Similarly, the previous bit rate, R, becomes the bit rates, $R_1$ and $R_2$, of each video clip. The values $m_1$ and $m_2$ are the number of transport packets on either side of the bit rate change after any transport stuffing has occurred:

$$m_1 = n_1 + S_1$$

$$m_2 = S_2 + n_2$$

The proper number of stuffing transport packets may be determined for each video clip separately, without the need for a constant bit rate across the splice point. After any necessary transport packet stuffing has occurred, the following will be true:

$$\Delta_P \operatorname{div} F \approx 0$$

From the earlier time base transform calculations:

$$\Delta_P = P_{21} - P_1$$

$$= P_2 + (\Delta_C \div 300) - P_1$$

$$= P_2 - P_1 + ((C_{21} - C_2) \div 300)$$

$$= P_2 - P_1 + ((C_1 + (m_1 \times R_1) + (m_2 \times R_2) - C_2) \div 300)$$

$$= (P_2 + (((m_2 \times R_2) - C_2) \div 300)) + ((C_1 + (m_1 \times R_1)) \div 300) - P_1)$$

$$= (P_2 - (C_2 \div 300) + (m_2 \times R_2 \div 300)) +$$

$$((m_1 \times R_1 \div 300) - (P_1 - (C_1 \div 300)))$$

The last relationship is the sum of two terms, each of which depends only on terms within a single video clip. Making each term an even multiple of the frame rate, F, the sum will also be an even multiple of F. This permits determination of the correct number of stuffing transport packets, $S_1$ and $S_2$, without knowledge of the other video clip's PTSs, PCRs, or bit rate. For $S_2$:

$$(P_2 - (C_2 \div 300) + (m_2 \times R_2 \div 300)) \operatorname{div} F = 0$$

$$(P_2 - (C_2 \div 300) + (n_2 \times R_2 \div 300) + (S_2 \times R_2 \div 300)) \operatorname{div} F = 0$$

$$F - ((P_2 - (C_2 \div 300) + (n_2 \times R_2 \div 300)) \operatorname{div} F) = S_2 \times R_2 \div 300$$

$$S_2 = (F - ((P_2 - (C_2 \div 300) + (n_2 \times R_2 \div 300)) \operatorname{div} F)) \div (R_2 \div 300)$$

$S_1$ can be determined similarly:

$$((m_1 \times R_1 \div 300) - (P_1 - (C_1 \div 300))) \operatorname{div} F = 0$$

$$((n_1 \times R_1 \div 300) + (S_1 \times R_1 \div 300) - (P_1 - (C_1 \div 300))) \operatorname{div} F = 0$$

$$F - (((n_1 \times R_1 \div 300) - (P_1 - (C_1 \div 300))) \operatorname{div} F) = S_1 \times R_1 \div 300$$

$$S_1 = (F - (((n_1 \times R_1 \div 300) - (P_1 - (C_1 \div 300))) \operatorname{div} F)) \div (R_1 \div 300)$$

This calculation of $S_1$ works for the case of:

$$n_1 \times R_1 \div 300 \geq P_1 - (C_1 \div 300)$$

If this relation is not true, the preceding calculation of $S_1$ is not valid. Instead, the original equation is true if:

$$m_1 \times R_1 \div 300 = P_1 - (C_1 \div 300)$$

$$n_1 + S_1 = (P_1 - (C_1 \div 300)) \div (R_1 \div 300)$$

$$S_1 = ((P_1 - (C_1 \div 300)) \div (R_1 \div 300)) - n_1$$

The stuffing transport packets may be any combination of:
MPEG null packets
PAT and PMT packets
Packets on the video elementary containing any combination of:
Adaptation field
Payload containing zeros
Payload containing a Sequence end code
Payload containing a solid blank I-frame
Payload containing a P-frame that results in an unmodified copy of the reference frame The exact choice will depend on the particular circumstances causing the splice and the desired visual effect (e.g., displaying the previous reference frame vs. displaying a black frame).

B-Frame Removal

Removal of unwanted B-frames from the start of a video clip may begin with preparation of the video content before making it available for video delivery. The starting location and length may be recorded for B-frames that refer to both:
A reference frame in a different Group of Pictures, and
An I-frame in the current Group of Pictures.

The I-frame in the current Group of Pictures each B-frame of these B-frames references may also be recorded. Additional information about the I-frame, such at the PTS, DTS, and PCR, may also be recorded.

This information may then be used in combination with the original video data to produce a splice with the unwanted B-frames removed. The start of the resulting video clip is a sequence of dynamically created MPEG data and video data taken unmodified from the original content. Its simplified structure within the video elementary stream is:

| Dynamically created data $G_1$ | Original video data $D_1$ | Dynamically created data $G_2$ | Original video data $D_2$ |
|---|---|---|---|

The first segment of original video data, $D_1$, comprises the entire I-frame which starts the video clip. It starts with the MPEG Picture Header and ends with the last Slice composing the I-frame. Neither the start nor the end is required to be aligned on a transport packet boundary or a PES packet boundary.

The second segment of the original video data, $D_2$, begins after the last Slice of the B-frame or B-frames to be removed and continues to the end of the video clip. Again, the start is not required to be aligned on a transport packet boundary or a PES packet boundary.

The first piece of dynamically created data, $G_1$, may include the following:

The PCR in the new clip's time base as part of the adaptation field in the first transport packet.

A PES packet header for a PES packet of unspecified length, and containing the PTS and DTS of the I-frame in $G_1$.

A Sequence Header and Sequence Extension describing the video clip.

A Group of Pictures Header corresponding to the I-frame in $G_1$.

Zeros in the PES packet payload sufficient to maintain the proper transport packet alignment in $G_1$.

Figure 4:
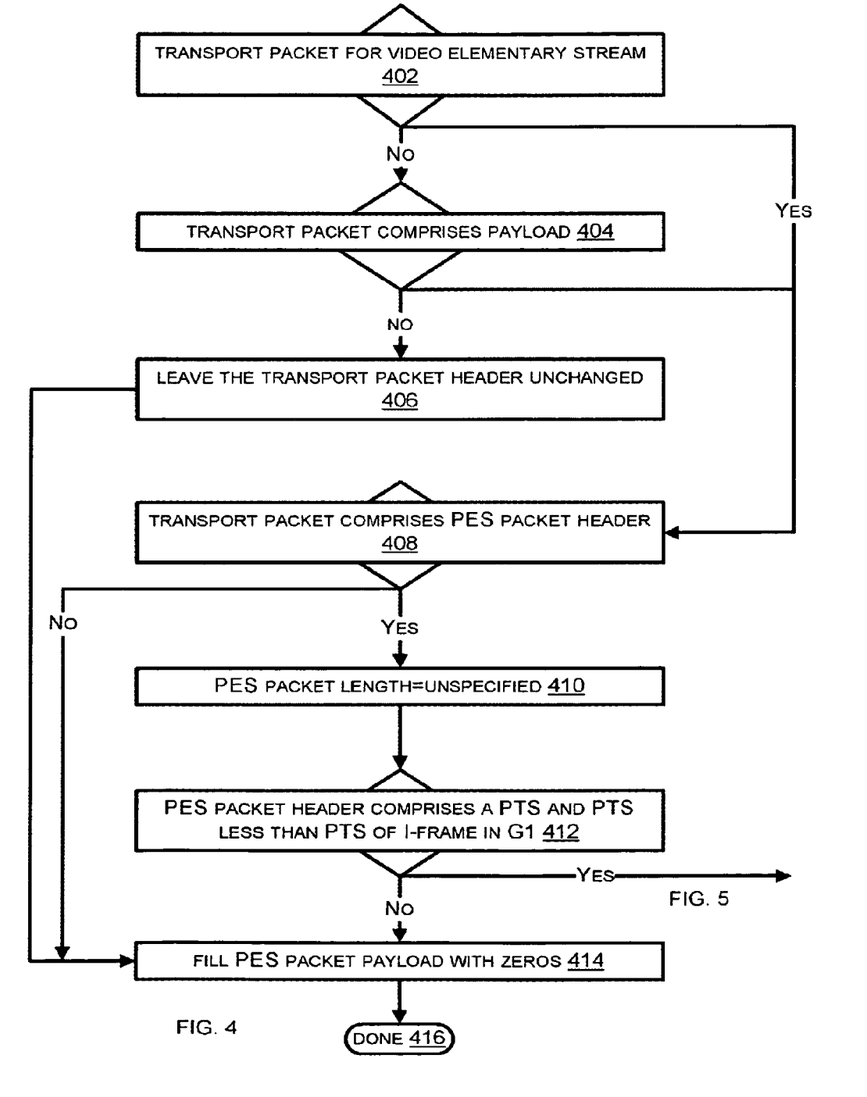
FIGS. 4 and 5 are flow charts of an embodiment of a process of modifying the B-frame or B-frames of content to splice, including intervening non-video transport packets and transport packet and PES packet headers.
Figure 5:
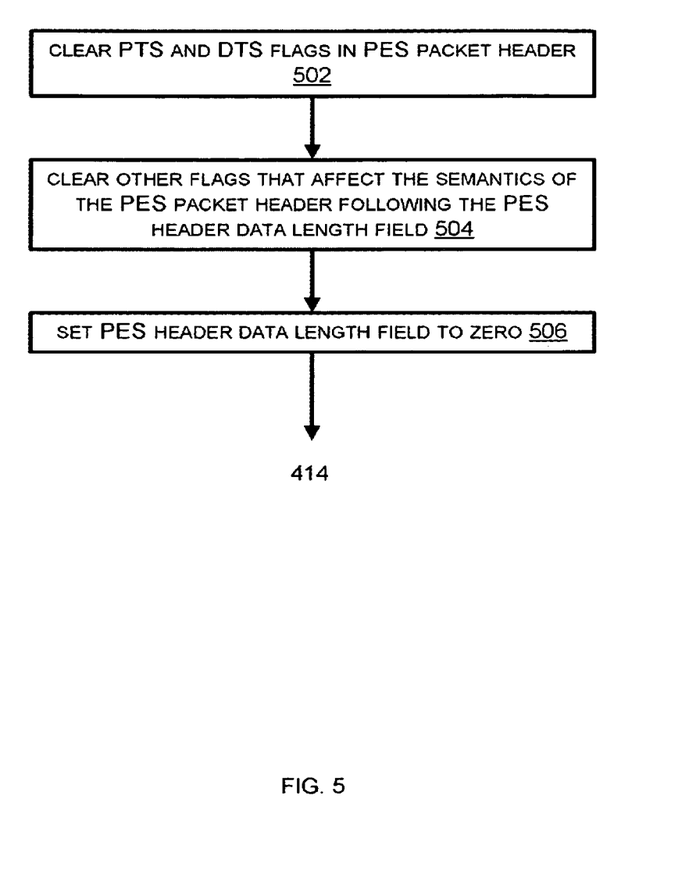

The second piece of dynamically created data, $G_2$, may be formed by making a copy of the B-frame or B-frames identified when the content was prepared, including intervening non-video transport packets and transport packet and PES packet headers. This copy may be modified and used in place of the original content. The copy may be modified on a transport-packet-by-transport-packet basis as follows and as illustrated in FIG. 4 and FIG. 5:

If the transport packet is not for the video elementary stream, leave it unchanged (402).

If the transport packet contains no payload, leave it unchanged (404).

In all other cases, leave the transport packet header unchanged (406).

If the transport packet contains a PES packet header (408), modify the PES packet header as follows:

Set the PES packet length to unspecified (410).

If the PES packet header contains a PTS, and the PTS is less than the PTS of the I-frame in $G_1$ (412), clear the PTS and DTS flags in the PES packet header (502), plus any other flags that affect the semantics of the PES packet header following the PES Header Data Length field (504). Set the PES Header Data Length field to zero (506).

Fill the PES packet payload section of the transport packet with zeros (414).

The described embodiments for splicing video clips provides visually appealing splices between video clips on low-end set-top boxes more efficiently than current mechanisms. Both the stuffing transport packet determinations and the B-frame removal are computationally inexpensive, allowing for the creation of cleaner splices at run time on lower cost, lower performance video servers.

The stuffing transport packet calculation obviates the need for a full remapping of video clip time bases to achieve a visually appealing transition. Currently, splicers depend on such a full remapping to maintain visual quality. The techniques described herein may be implemented via logic of one or more processing devices, including but not limited to video servers, splicers, set top boxes, and intermediate network devices.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A digital splicing process comprising:
    calculating the length of data to be inserted into a transport stream between first and second video clips; and
    removing B-frames in the second clip that reference non-existent I-frames as follows:
    if a transport packet for a removed B-frame contains a PES packet header, modify the PES packet header as follows by (a) setting a PES packet length of the PES packet header to unspecified, (b) if the PES packet header contains a PTS, and the PTS is less than a PTS of a preceding I-frame, clearing a PTS flag and a DTS flag in the PES packet header, and (c) setting a PES Header Data Length field of the PES header to zero.

2. The process of claim 1, wherein calculating the length of data to be inserted into a transport stream between first and second video clips further comprises:
    determining an offset of the timebases of the two video clips.

3. The process of claim 2, wherein determining an offset of the timebases of the two video clips further comprises:
    extrapolating a Program Clock Reference (PCR) of a first frame of the second video clip into a timebase of the first video clip.

4. The process of claim 2, wherein determining an offset of the timebases of the two video clips further comprises:
    determining the offset of the timebases as an integral number of frame periods.

5. The process of claim 1, wherein calculating the length of data to be inserted into a transport stream between first and second video clips further comprises:
    finding a first amount of data to insert after the first video clip, and a second amount of data to insert before the second video clip.

6. The process of claim 5, further comprising:
    calculating the first amount of data to insert after the first video clip independently of the second video clip's PCR, Presentation Time Stamp (PTS), or bitrate; and
    calculating the second amount of data to insert before the second video clip independently of the first video clip's PCR, PTS, or bitrate.

7. The process of claim 1, wherein removing B-frames in the second clip that reference non-existent I-frames further comprises:
    determining a starting location and length of B-frames that refer to reference frames in different Group of Pictures and I-frames in the current Group of Pictures.

8. The process of claim 7, wherein further comprising:
    determining the I-frames in the current Group of Pictures that are referenced by the B-frames.

9. The process of claim 1, wherein removing B-frames in the second clip that reference non-existent I-frames further comprises:
    modifying a Packetized Elementary Stream (PES) header by setting the packet length to unspecified.

10. The process of claim 1, wherein modifying the Packetized Elementary Stream (PES) header further comprises:
    clearing PTS and Decoder Time Stamp (DTS) flags, and setting the PES Header Data Length field to zero.

11. The process of claim 1, wherein removing B-frames in the second clip that reference non-existent I-frames further comprises:
    filling a PES packet payload section with zero.

12. A network video splicer device, comprising:
    non-transitory machine memory and/or circuits comprising logic to
    (a) calculate the length of data to be inserted into a transport stream between first and second video clips; and
    (b) remove B-frames in the second clip that reference non-existent I-frames without replacing the removed B-frames with new B-frames, as follows:
    if a transport packet for a removed B-frame contains a PES packet header, modify the PES packet header as follows by (a) setting a PES packet length of the PES packet header to unspecified, (b) if the PES packet header contains a PTS, and the PTS is less than a PTS of a preceding I-frame, clearing a PTS flag and a DTS flag in the PES packet header, and (c) setting a PES Header Data Length field of the PES header to zero.

13. The device of claim 12, wherein the logic to calculate the length of data to be inserted into a transport stream between first and second video clips further comprises:
    logic to determine an offset of the timebases of the two video clips.

14. The device of claim 13, wherein the logic to determine an offset of the timebases of the two video clips further comprises:
    logic to extrapolate a Program Clock Reference (PCR) of a first frame of the second video clip into a timebase of the first video clip.

15. The device of claim 13, wherein the logic to determine an offset of the timebases of the two video clips further comprises:

logic to determine the offset of the timebases as an integral number of frame periods.

16. The device of claim 12, wherein the logic to calculate the length of data to be inserted into a transport stream between first and second video clips further comprises:
   logic to find a first amount of data to insert after the first video clip, and a second amount of data to insert before the second video clip.

17. The device of claim 16, further comprising:
   logic to calculate the first amount of data to insert after the first video clip independently of the second video clip's PCR, Presentation Time Stamp (PTS), or bitrate; and
   logic to calculate the second amount of data to insert before the second video clip independently of the first video clip's PCR, PTS, or bitrate.

18. The device of claim 12, wherein the logic to remove B-frames in the second clip that reference non-existent I-frames further comprises:
   logic to determine a starting location and length of B-frames that refer to reference frames in different Group of Pictures and I-frames in the current Group of Pictures.

19. The device of claim 18, further comprising:
   logic to determine the I-frames in the current Group of Pictures that are referenced by the B-frames.

20. The device of claim 12, wherein the logic to wherein the logic to remove B-frames in the second clip that reference non-existent I-frames further comprises:
   logic to modify a Packetized Elementary Stream (PES) header by setting the packet length to unspecified.

\* \* \* \* \*